US009690615B2

(12) United States Patent
Dong et al.

(10) Patent No.: US 9,690,615 B2
(45) Date of Patent: Jun. 27, 2017

(54) LIVE MIGRATION OF VIRTUAL MACHINES FROM/TO HOST COMPUTERS WITH GRAPHICS PROCESSORS

(71) Applicant: Intel Corporation, Santa Clara, CA (US)

(72) Inventors: Yao Zu Dong, Shanghai (CN); Zhiyuan Lv, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/777,316

(22) PCT Filed: Nov. 12, 2014

(86) PCT No.: PCT/CN2014/090883
§ 371 (c)(1),
(2) Date: Sep. 15, 2015

(87) PCT Pub. No.: WO2016/074166
PCT Pub. Date: May 19, 2016

(65) Prior Publication Data
US 2016/0299773 A1    Oct. 13, 2016

(51) Int. Cl.
*G06F 9/455*    (2006.01)
*G06T 1/20*    (2006.01)
(Continued)

(52) U.S. Cl.
CPC .......... *G06F 9/45558* (2013.01); *G06F 9/445* (2013.01); *G06F 9/50* (2013.01);
(Continued)

(58) Field of Classification Search
None
See application file for complete search history.

(56) References Cited

U.S. PATENT DOCUMENTS 7,650,603 B2 * 1/2010 Green .................. G06T 1/00
345/501
8,830,228 B2 * 9/2014 Zhang .................. G06F 9/4411
345/419
(Continued)

FOREIGN PATENT DOCUMENTS

CN    102081552 A    6/2011
CN    102681913 A    9/2012

OTHER PUBLICATIONS

Kashyap et al, RLC—A Reliable approach to Fast and Efficient Live Migration of Virtual Machines in the Clouds, 2014, IEEE, Cloud '14 Proceedings of the 2014 IEEE International Conference on Cloud Computing, pp. 360-367.*
(Continued)

*Primary Examiner* — Abu Ghaffari
(74) *Attorney, Agent, or Firm* — Schwabe, Williamson & Wyatt, P.C.

(57) ABSTRACT

Apparatuses, methods and storage medium associated with live migration of virtual machines (VMs) from/to host computers with graphics virtualization are disclosed herein. In embodiments, an apparatus may include a virtual machine monitor (VMM) having a memory manager to manage accesses of system memory of the apparatus, including tracking of modified memory pages of the system memory. Additionally, the VMM may include a graphics command parser to analyze graphics commands issued to a graphics processor (GPU) of the apparatus to detect writes to the system memory caused by the graphics commands, and augment the tracking of modified memory pages. Further, the VMM may include a live migration function to live migrate a VM to another apparatus, including provision of current memory content of the VM, utilizing modified
(Continued)

memory pages tracked by the memory manager, as augmented by the graphics command parser.

22 Claims, 7 Drawing Sheets

(51) Int. Cl.
G06F 9/445 (2006.01)
G06F 9/50 (2006.01)
(52) U.S. Cl.
CPC ........ G06T 1/20 (2013.01); *G06F 2009/4557* (2013.01); *G06F 2009/45583* (2013.01); *G06T 2200/28* (2013.01)

(56) References Cited

U.S. PATENT DOCUMENTS

| 9,069,622 | B2* | 6/2015 | Post | G06F 9/5088 |
|---|---|---|---|---|
| 2007/0103476 | A1* | 5/2007 | Huang | G06T 15/005 |
| | | | | 345/522 |
| 2011/0119427 | A1 | 5/2011 | Dow et al. | |
| 2012/0042034 | A1* | 2/2012 | Goggin | G06F 9/4856 |
| | | | | 709/216 |
| 2012/0180042 | A1* | 7/2012 | Tsirkin | G06F 9/45558 |
| | | | | 718/1 |
| 2013/0091500 | A1* | 4/2013 | Earl | G06F 9/4555 |
| | | | | 718/1 |
| 2014/0181806 | A1* | 6/2014 | Abiezzi | G06F 9/45558 |
| | | | | 718/1 |
| 2015/0149999 | A1* | 5/2015 | Ramanathan | G06F 9/4856 |
| | | | | 718/1 |
| 2015/0193250 | A1* | 7/2015 | Ito | G06F 9/4856 |
| | | | | 718/1 |
| 2015/0371354 | A1* | 12/2015 | Petersen | G06T 1/20 |
| | | | | 345/522 |
| 2015/0371355 | A1* | 12/2015 | Chen | G06T 1/20 |
| | | | | 345/505 |
| 2016/0078585 | A1* | 3/2016 | Sheldon | G06F 9/45558 |
| | | | | 345/520 |

OTHER PUBLICATIONS

Menon et al, iGPU: Exception Support and Speculative Execution on GPUs, 2012, IEEE, pp. 72-83.*
International Search Report and Written Opinion mailed Aug. 17, 2015 for International Application No. PCT/CN2014/090883, 10 pages.

* cited by examiner

Legend: Italics denote optional

LIVE MIGRATION OF VIRTUAL MACHINES FROM/TO HOST COMPUTERS WITH GRAPHICS PROCESSORS

CROSS REFERENCE TO RELATED APPLICATIONS

The present application is a national phase entry under 35 U.S.C. §371 of International Application No. PCT/CN2014/090883, filed Nov. 12, 2014, entitled "LIVE MIGRATION OF VIRTUAL MACHINES FROM/TO HOST COMPUTERS WITH GRAPHICS VIRTUALIZATION", which designated, among the various States, the United States of America. The Specification of the PCT/CN2014/090883 Application is hereby fully incorporated by reference.

TECHNICAL FIELD

The present disclosure relates to the field of computing. More particularly, the present disclosure relates to live migration of virtual machines from/to host computers with graphics virtualization.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Traditional live migrations of virtual machines (VM) typically involve incremental migration of memory content, because the cost of migrating an entire system memory is large and impractical. It is not endurable to stall the whole system for a prolonged period of time to enable the entire system memory to be migrated. Instead, systems usually migrates only the modified portion of the memory over several iterations, while the system is still running During that period, newly marked memory pages are marked as "dirty," and migrated in a subsequent iteration.

Recent advances in virtualization and graphics technology have enabled more efficient graphics virtualization among multiple VMs on host computers. Advanced graphics virtualization now often supports native graphics driver running inside the VMs to enable user applications of the VMs to have accesses to the full range of graphics capabilities supported by the graphics processing units (GPU) of the host computers. Often, a GPU device model is implemented inside the virtual machine monitor (VMM) of a host computer to emulate the accesses of GPU resources like memory mapped input-output (MMIO). The GPU is able to manipulate system memory of the host computer when processing the GPU commands, and the manipulation of the system memory is not known to the memory manager of the VMM.

Resultantly, prior art live migration of VMs no longer works when the latest GPU virtualization is involved. Further, migrations become even more complicated when the target host computers of live migration have GPUs that are different from the GPUs of the source host computers of live migration. Traditional live migration approach cannot handle such live migrations, since the states for the two GPUs of the source and target host computers do not exactly match.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
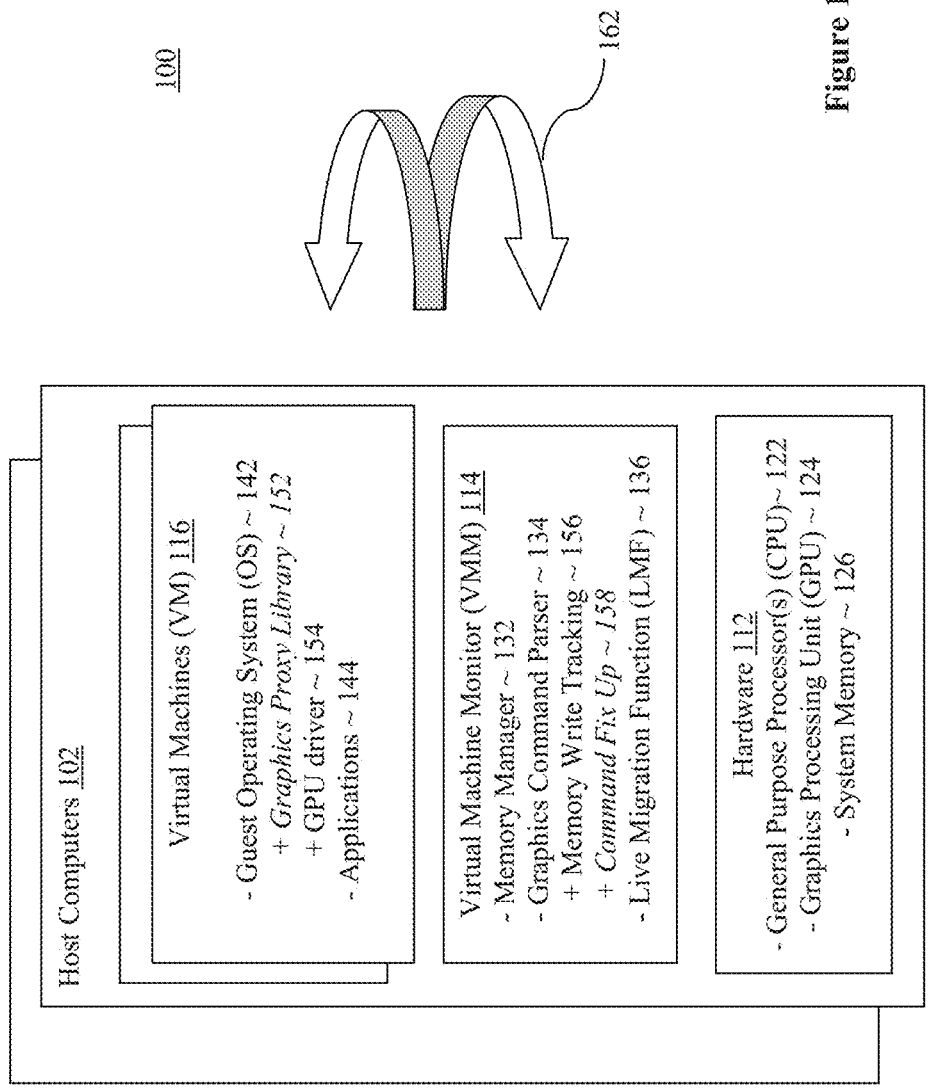
FIG. 1 illustrates an example computing arrangement suitable for practicing the present disclosure, according to the disclosed embodiments.

Apparatuses, methods and storage medium associated with live migration of VMs from/to host computers with graphics virtualization are disclosed herein. In embodiments, an apparatus for computing may include a VMM to manage VMs hosted by one or more general purpose processors (CPUs) of the apparatus. The VMM may include a memory manager to manage accesses of system memory of the apparatus by instructions of applications of the VMs, executed by the CPUs. Management of accesses may include tracking of modified memory pages of the system memory. Additionally, the VMM may include a graphics command parser to analyze graphics commands issued to a graphics processing unit (GPU) of the apparatus by the applications to detect writes to the system memory caused by the graphics commands, and augment the tracking of modified memory pages. Further, the VMM may include a live migration function to selectively live migrate one or more of the VMs to another apparatus for computing, including provision of current memory content of a VM being live migrated to the other apparatus, utilizing modified memory pages tracked by the memory manager, as augmented by the graphics command parser.

In embodiments, the command parser may be further configured to analyze the graphics commands to determine whether the graphics commands are supported by the GPU. Further, the command parser may be configured to determine whether a first of the graphics commands can be modified to a form supported by the GPU or replace with a functional equivalent graphics command supported by the GPU, on determination that the first graphics command is not supported by the GPU. Still further, the command parser may be further configured to modify the first graphics command to a form supported by the GPU on determination that the first graphics command can be modified to a form supported by the GPU, or replace the first graphics command with the other functional equivalent graphics command supported by the GPU, on determination of existence of the other functional equivalent graphics command.

In embodiments, the apparatus may further include a graphics proxy library to be instantiated in at least a first of the VMs, wherein the graphics proxy library is to maintain a context of a graphics application programming interface (API) that abstracts the GPU for the first VM. Additionally, the graphics proxy library may be configured to detect whether the context is maintained for abstraction of another GPU of another apparatus (the two GPUs being functionally different GPUs). Further, the graphics proxy library may be configured to re-create the graphics context for the GPU, on detection that the context is maintained for abstraction of a different GPU.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an example computing arrangement incorporated with the teachings of the present disclosure, according to various embodiments, is shown. As illustrated, computing arrangement 100 may include a number of host computers 102, coupled with each other directly via cables, or indirectly, via one or more networks 162. Each host computer 102 may be configured with hardware 112 and VMM 114 to manage and host a number of VMs 116. As will be described in more detail below, at least some of host computers 102 are configured to support advanced graphics virtualization as described earlier, and incorporated with teachings of the present disclosure to enable live migration of the hosted virtual machines nonetheless.

More specifically, in some embodiments, these host computers 102 may be incorporated with teachings of the present disclosure to enable live migration of a hosted virtual machine between a source and a target host computer 102, where the GPUs 124 are of the same kind. In other embodiments, these host computers 102 may be incorporated with additional teachings of the present disclosure to enable live migration of a hosted virtual machine between a source and a target host computer 102, where the GPUs 124 are not of the same kind, but of a similar kind. For the purpose of this application, two GPUs are of a different but similar kind if graphics commands of one GPU may be modified in form or replaced with functional equivalent graphics commands, such that the graphics commands are supported by the other GPU. In still other embodiments, these host computers 102 are incorporated with additional teachings of the present disclosure to enable live migration of a hosted virtual machine between a source and a target host computer 102, where the GPUs 124 are of different and dissimilar kinds. For the purpose of this application, two GPUs are of different and dissimilar kinds, if they are not at least of different but similar kinds. Two GPUs are identical if they are closer than different but similar kinds. An example of two GPUs that are different but similar are GPUs of different generations from the same vendor, where the graphics commands of the GPU of one generation may be modified to be supported by the GPU of a next generation. An example of two GPUs that are different and dissimilar are GPUs of different vendors with different instruction set architectures.

Continuing to refer to FIG. 1, hardware 112 of each host computer 102 may include system memory 126, one or more CPUs 122 to execute non-graphics instructions of applications 144, and as described earlier, at least some host computers 102 may further include a GPU 124 to execute graphics instructions of applications 144. System memory 126 may be a wide range of volatile or non-volatile storage. CPUs 122 of various host computers 102 may be of the same or different kinds. Likewise, GPU 124 of various host computers 102 may be of the same, similar, or significantly different kinds. In other words, CPUs 122 and GPU 124 may be any one of a number of CPUs and GPUs known in the art. Additionally, beside CPUs 122 and GPU 124, hardware 112 may include other hardware elements (not shown), including but are not limited to mass storage, communication/networking interfaces, input-output devices, and so forth.

VMM 114 of each host computer 102 may include memory manager 132 to manage accesses of the system memory of the host computer 102 by VM 116 (e.g., accesses by non-graphics instructions of guest operating system (OS) 142 and applications 144). In embodiments, system memory may be organized into pages, and management of accesses may include tracking of modified memory pages. Additionally, for at least some of host computers 102, VMM 114 may further include live migration function 136 configured to support live migration of VMs 116 from one source host computer 102 to a target host computer 102, and graphics command parser 134 configured to support advanced graphics virtualization as earlier described. And in some of these embodiments, graphics command parser 134 may be further incorporated with the teachings of the present disclosure to support live migration of VMs from a source to a target host computer with GPUs of the same or similar kind. More specifically, in embodiments, graphics command parser 134, in addition to being configured to parse and forward graphics commands to GPU 124, may be configured with write memory tracking function 156 to detect writes to system memory by GPU caused by the graphics commands, and on detection, augment the tracking of modified memory pages by memory manager 132. Thus, live migration function 136 may provide current memory content of a VM being migrated from/to source and target host computers 102, based on the tracking of modified memory pages, as augmented by graphics command parser 134. Additionally, in embodiments, graphics command parser 134 may be further configured with command fix up function 158 to modify the form of a graphics command or to replace a graphics command with another functional equivalent graphics command to enable live migration of VMs 116 with graphics virtualization from/to source and target host computers 102 with GPUs 124 of the different but similar kind. Except for the teachings of the present disclosure, VMM 114, including memory manager 132, graphics command parser 134 and live migration function 136 may be any one of a number of these elements known in the art.

Each VM 116, as alluded to earlier, may include its own guest OS 142 and applications 144. For host computers 102 with GPU 124, guest OS 142 may include GPU driver 154 and applications 144 may include graphics instructions as well as conventional non-graphics instructions. Further, in embodiments, guest OS 142 may include graphics proxy library 152 incorporated with teachings of the present disclosure to support live migration of VMs from a source to a target host computer 102 with GPUs that are of different and dissimilar kinds. More specifically, graphics proxy library 152 may be configured to track the graphics context of a graphics API, and re-construct the graphics context for a different abstraction of GPU by the graphics API to enable live migration of VMs 116 with graphics virtualization from/to source and target host computers 102 with GPUs 124 of the different and dissimilar kind. Except for the teachings of the present disclosure, OS 142, including graphics proxy library 152 and graphics driver 154, and applications 144 may be any one of a number of these elements known in the art.

In summary, computing arrangement 100 may include a number of host computers 102, at least two of which may be incorporated with teachings of the present disclosure to support at least one of three levels of live migration of a virtual machine from a source host computer 102 to a target host computer 102 with graphics virtualization. The three levels of live migration of a virtual machine from a source host computer 102 to a target host computer 102 with graphics virtualization are:

a) from a source host computer 102 to a target host computer 102 with graphics virtualization of GPUs 124 of the same kind;

b) from a source host computer 102 to a target host computer 102 with graphics virtualization of GPUs 124 of different but similar kinds;

c) a) from a source host computer 102 to a target host computer 102 with graphics virtualization of GPUs 124 of different and dissimilar kinds.

Figure 2:
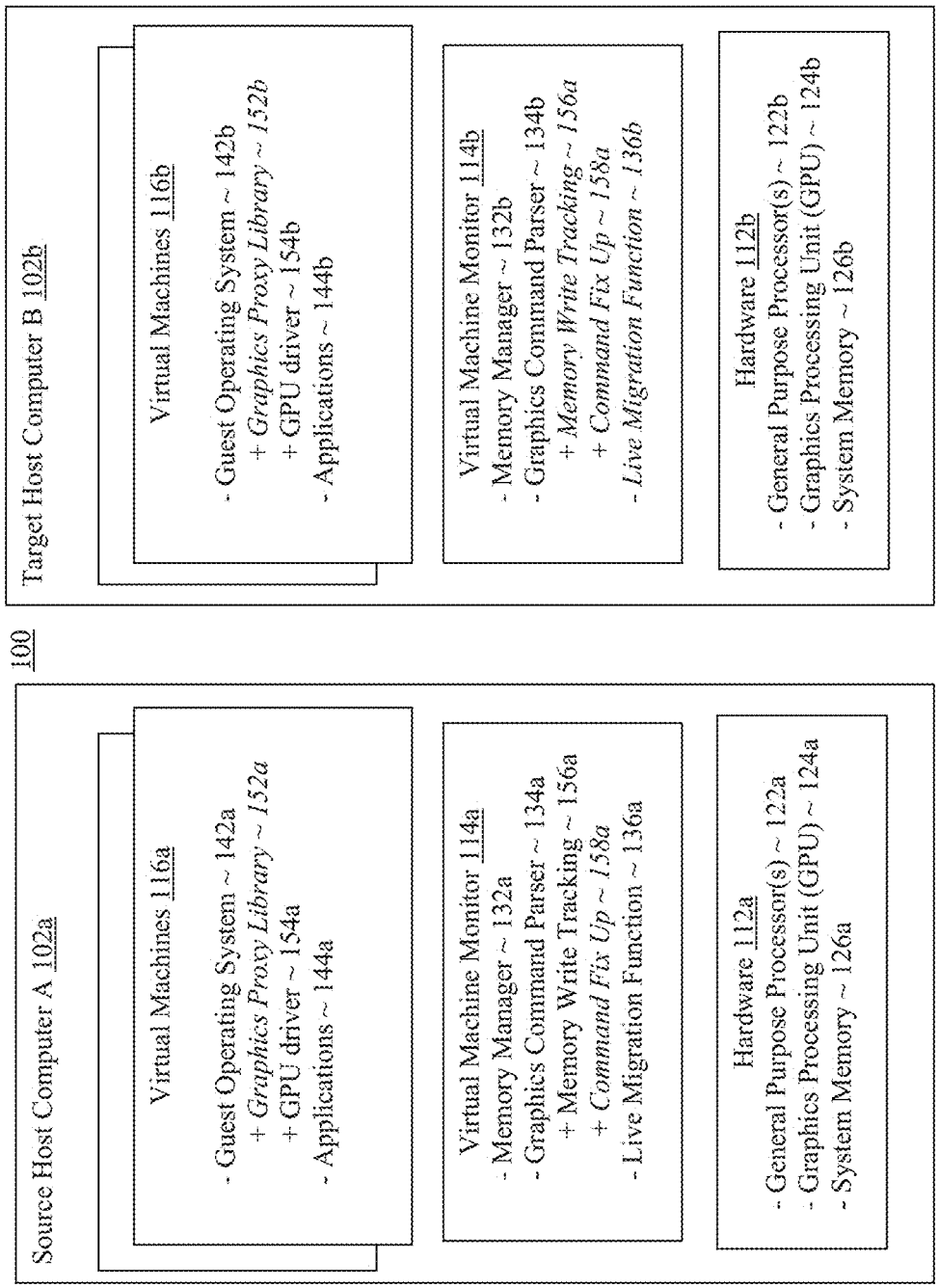
FIG. 2 illustrates an example pair of source and target host computers, according to the disclosed embodiments.

Referring now to FIG. 2, wherein an example pair of source and target host computers incorporated with the teachings of the present disclosure, according to various embodiments, is shown. As illustrated and earlier described, source host computer 102*a* may include hardware 112*a* with CPUs 122*a* and GPU 124*a*. Source host computer 102*a* may further include VMM 114*a* and hosted VMs 116*a*. VMM 114*a* may include memory manager 132*a*, graphics command parser 134*a* with memory write tracking function 156*a*, and live migration function 136*a*. A VM 116*a* may include guest OS 142*a* with GPU driver 154*a*, and applications 144*a*. Live migration function 136*a* may be configured to live migrate a VM 116*a* to a target host computer 102*b* with graphics virtualization across VMs 116*b* of GPU 124*b*, that is of the same kind as GPU 124*a*, utilizing the tracking of modified memory pages by memory manager 132*a*, as augmented by graphics command parser 134*a*. For live migration of a VM 116*a* to a target host computer 102*b* with graphics virtualization across VMs 116*b* of GPU 124*b* that is of the same kind as GPU 124*a*, target host computer 102*b* may include hardware 112*b* with CPUs 122*b* and GPU 124*b* of the same kind. Target host computer 102*b* may further include VMM 114*b* and hosted VMs 116*b*. VMM 114*b* may include memory manager 132*b*, and graphics command parser 134*b*. For a target host computer 102*b*, it is optional whether graphics command parser 134*b* is configured with memory write tracking function 156*b*, or whether VMM 114*b* is configured with live migration function 136*a*. A VM 116*b* may include guest OS 142*b* with GPU driver 154*b*, and applications 144*b*. If target host computer 102*b* is to operate as source host computer 102*a* at a different point in time, graphics command parser 134*b* may be configured with memory write tracking function 156*b*, and VMM 114*b* may be configured with live migration function 136*b*.

In other embodiments, live migration function 136*a* may be further configured to live migrate a VM 116*a* to a target host computer 102*b* with graphics virtualization across VMs 116*b* of GPU 124*b*, that is of a different, but similar kind as GPU 124*a*. To enable live migration of a VM 116*a* to a target host computer 102*b* with graphics virtualization across VMs 116*b* of GPU 124*b*, that is of a different but similar kind as GPU 124*a*, graphics command parser 134*b* may be further configured to determine whether GPU 124*b* is of a different by similar kind as GPU 124*a*, e.g., via identification of graphics processor types of GPU 124*a* and 124*b*. Further, graphics command parser 134*b* may be further configured with command fix up function 158*a* to determine, on determining that GPU 124*a* and 124*b* are of different but similar kind, whether a graphics command for GPU 124*a* may be modified to a form that is supported by GPU 124*b* or replace the graphics command for GPU 124*a* with a function equivalent graphics command supported by GPU 124*b*. Additionally, command fix up function 158*a* may be configured to so modify a graphics command for GPU 124*a* to a form that is supported by GPU 124*b*, on determining that modification is possible, or replace the graphics command for GPU 124*a* with a function equivalent graphics command supported by GPU 124*b*, on determining that replacement is possible. In embodiments, graphics command parser 134*b* may be configured with tables (not shown) mapping the syntax and/or semantics of the graphics commands of GPUs 124*a* and 124*b*. For a source host computer 102*a*, it is optional whether graphics command parser 134*a* is configured with command fix up function 158*a*. If source host computer 102*a* is to operate as target host computer 102*b* at a different point in time, and support live migration of a VM from a source host computer with graphics virtualization across the VMs of a GPU that is different but similar to GPU 124*a*, graphics command parser 134*a* may be configured with command fix up function 158*a*.

In still other embodiments, live migration function 136*a* may be configured to live migrate a VM 116*a* to a target host computer 102*b* with graphics virtualization across VMs 116*b* of GPU 124*b*, that is of a different and dissimilar kind as GPU 124*a*. To enable live migration of a VM 116*a* to a target host computer 102*b* with graphics virtualization across VMs 116*b* of GPU 124*b*, that is of a different and dissimilar kind as GPU 124*a*, guest OS 142*a* of VM 116*a* may be further configured with graphics proxy library 152*a* to support an API that abstracts the graphics commands of GPU 124*a*. Graphics proxy library 152*a*, in addition to support the implementation of the API, may be configured to maintain the graphics context of the API tracking the resources used by the API, to enable a new graphics context to be built, after live migration, for the API that abstracts the graphics commands of the different and dissimilar GPU 124*b*. The resources tracked may include, but are not limited to, the context ID from the glCreateContext( ) call, the texture ID from the glCreateTexture( ), the shader program ID from the glCreateShader( ) call, and so forth. Graphics proxy library 152*a* becomes graphics proxy library 152*b* after VM 116*a* has been live migrated from source host computer 102*a* to target host computer 102*b* and become VM 116*b*. Additionally, graphics proxy library 152*a*/152*b* may be configured to detect the changing of the underlying GPU abstracted by the API, e.g., by detecting that the underlying graphic resources are of a different and dissimilar GPU. Further, graphics proxy library 152*a*/152*b* may be configured to re-construct the graphics context for the API on detecting that GPU 124*b* abstracted by the API, after live migration, is of a different and dissimilar kind from GPU 124*a*.

Figure 3:
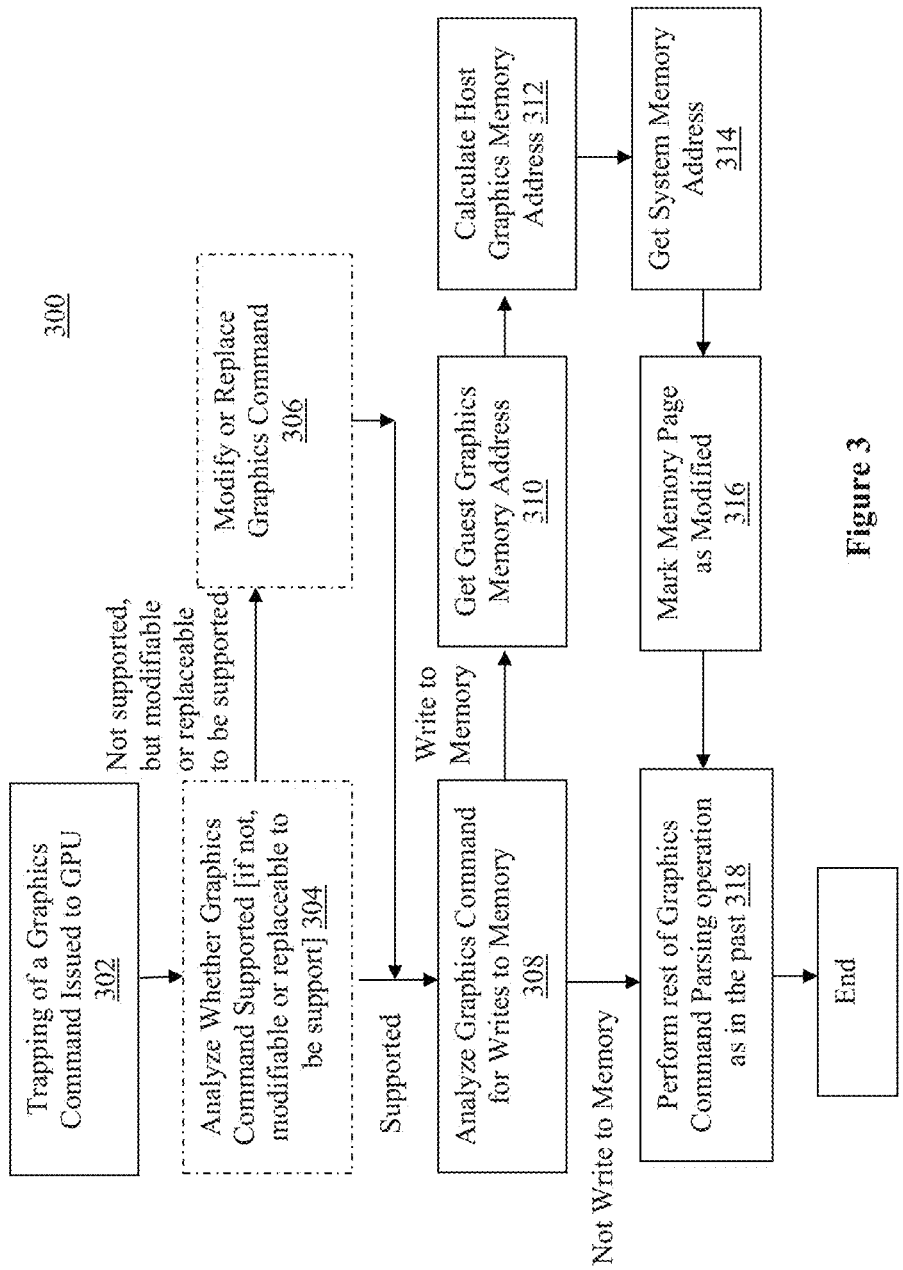
FIG. 3 illustrates an example method of operation for the graphics parser of FIGS. 1 and 2, according to the disclosed embodiments.

Referring now to FIG. 3, wherein an example method of operation for the graphics command parser of FIGS. 1 and 2, according to various embodiments, is shown. As illustrated, in embodiments, method 300 for graphics command parsing may include operations at blocks 302-318. While for ease of understanding, the operations at blocks 302-318 will be described in order, in alternate embodiment, some of the operations may be performed in different order, or may be optional. For example, at least operations at block 304-306 may be optionally performed in embodiments where live migration of VM across source and target host computers with graphics virtualization of GPUs that are different but similar, is supported. In still other embodiments, additional operations may be performed.

Method 300 may start at block 302 with the trapping of a graphics command being issued to a GPU, e.g., from the guest OS or an application of a hosted VM. In embodiments, the graphics command may be trapped e.g., by monitoring MMIO.

Next, at optional block 304, a determination may be made on whether the graphics command is supported by the GPU (in the event the hosted VM was live migrated from another host computer). In embodiments, on determination that the graphics command is not supported, a further determination may be made on whether the graphics command may be modified to a form that is supported by the GPU or replaced with another functional equivalent graphic command that is supported by the GPU.

On determination that the graphics command is not supported, but may be modified or replaced to be supported, method 300 may proceed to block 306. At block 306, the graphics command may be modified to a form that is supported by the GPU or replaced with another functional equivalent graphic command that is supported by the GPU. In embodiments, if the graphics command is not supported, but the graphics command cannot be modified or replaced to be supported, method 300 may return an error (not shown) and proceed to end.

Continuing to refer to FIG. 3, from block 302 (if only live migration to target host computer with GPU of the same kind is supported), block 304 (if the graphics command is determined to be supported), or from block 306 (if the graphics command is determined to be unsupported, but modifiable or replaceable to be supported), method 300 may proceed to block 308. At block 308, the graphics command may be analyzed and decoded. In particular, the graphics command may be analyzed to detect whether the graphics command will cause the GPU to write to system memory.

On determination that the graphics command will cause the GPU to write to system memory, method 300 may proceed to block 310. At block 310, the guest graphics memory address associated with the graphics command may be obtained. For some graphics commands, the memory addresses may be obtained from the graphics commands directly. For others who employ indirect addressing, the memory addresses may be calculated based on the offsets in the graphics commands and the base graphics address (which may be obtained e.g., by trapping the MMIO operation that set the base graphics address). On obtaining the guest graphics memory address, method 300 may proceed to block 312. At block 312, the host graphics memory address associated with the guest graphics memory address may be calculated (e.g., through the graphics page tables).

On calculating the host graphics memory address, method 300 may proceed to block 314. At block 314, the system memory address associated with the host graphics memory address may be obtained, e.g., from the system memory map. On obtaining the system memory address, method 300 may proceed to block 316. At block 316, the tracking of modified memory page by the memory manager may be augmented, e.g., by additionally updating a memory page table, marking a memory page comprising the system memory address as dirty.

From block 308 (on determining that the graphics command does not cause the GPU to write to system memory) or from block 316 (on augmenting the tracking of modified memory pages), method 300 may proceed to block 318, where the rest of the operations of the graphics command parsing, e.g., dispatching the decoded graphics command to the GPU, may be performed. Thereafter, method 300 may end.

Figure 4:
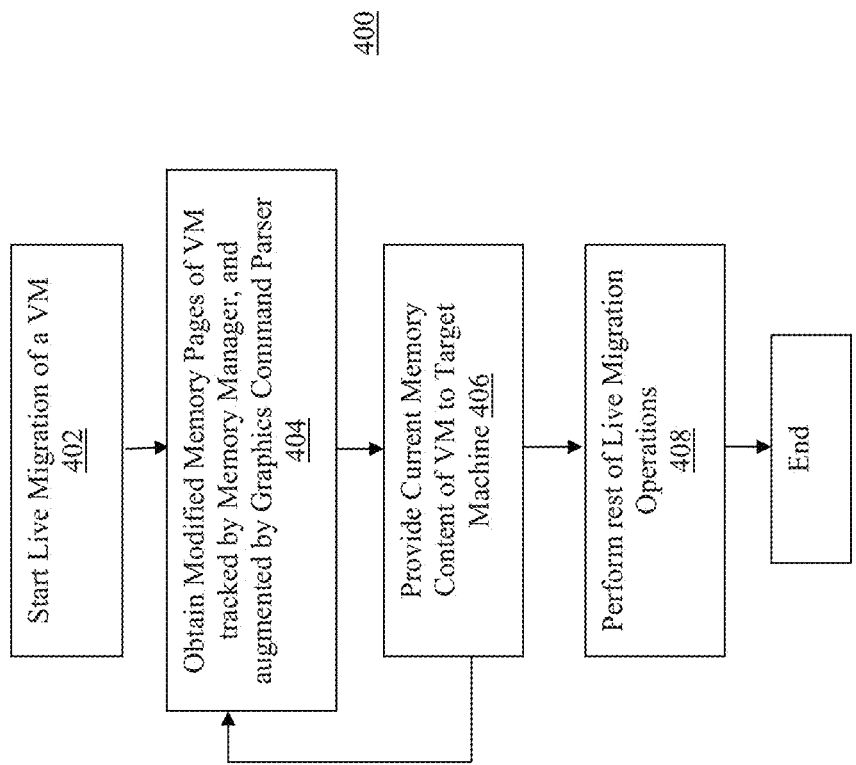
FIG. 4 illustrates an example method of operation for the live migration function of FIGS. 1 and 2, according to the disclosed embodiments.

Referring now to FIG. 4, wherein an example method of operation for the live migration function of FIGS. 1 and 2, according to various embodiments, is shown. As illustrated, in embodiments, method 400 for live migration of VM may include operations at blocks 402-408. While for ease of understanding, the operations at blocks 402-408 will be described in order, in alternate embodiment, some of the operations may be performed in different order, or may be optional. In other embodiments, additional operations may be performed.

Method 400 may start at block 402, where the process for live migrating a VM may begin. The live migration may be triggered by a number of system events, e.g., in response to an instruction from an administrator, in response to a hardware or software event, in response to the work load of the host computer exceeding a threshold level, and so forth. In embodiments, a determination may be made, prior to the start of live migration, to confirm that the target computer has the same GPU, a different but similar GPU complemented with an appropriate graphics command parser, or a different but dissimilar GPU complemented with an appropriate graphics proxy library as earlier described. In the different but dissimilar GPU situation, the determination may also confirm that the source host computer is also complemented with the earlier described graphics proxy library configured to maintain a graphics context. In embodiments, the "live migration" may be aborted if no appropriate target host computer is found.

Next, on commencement of live migration, at block 404, modified memory pages as tracked by the memory manager, and augmented by the graphics command parser may be obtained. Thereafter, at block 406, the current memory content of the VM being migrated may be provided to the target host computer, based on the modified memory pages as tracked by the memory manager, and augmented by the graphics command parser obtained. As shown, the operations at blocks 404 and 406 may be repeated a number of times, as many times as necessary, to capture all the memory modifications while the live migration is in progress.

Eventually, all memory modifications are captured and provided to the target host computer. At that time, method 400 may proceed to block 406. At block 408, the rest of live migration operation may be performed as in the past. Thereafter, method 400 may end.

Figure 5:
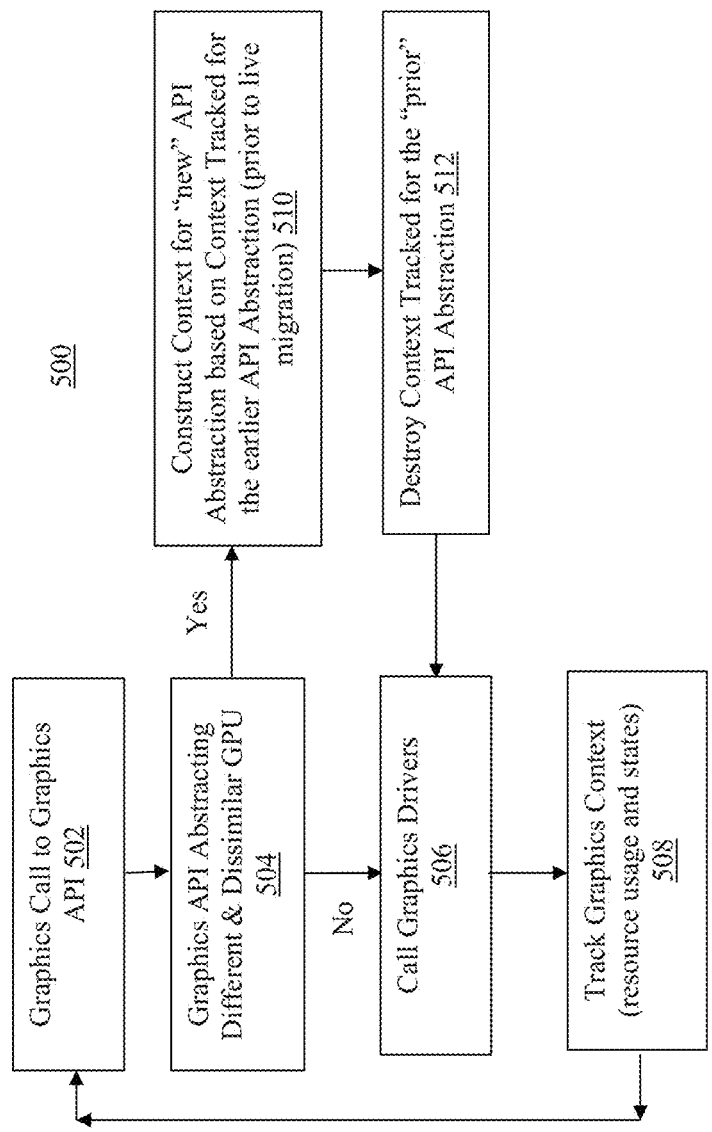
FIG. 5 illustrates an example method of operation for the graphics proxy library of FIGS. 1 and 2, according to the disclosed embodiments.

Referring now to FIG. 5, wherein an example method of operation for the graphics proxy library of FIGS. 1 and 2, according to various embodiments, is shown. As earlier described, a graphics proxy library may be configured to support a graphics API that abstracts the graphics commands of an underlying GPU. In particular, the graphics proxy library may be incorporated with teachings of the present disclosure to track and reconstruct graphics context for the API. As shown, in embodiments, method 500 for graphics proxy library may include operations at blocks 508-512. While for ease of understanding, the operations at blocks 508-512 will be described in order, in alternate embodiment, some of the operations may be performed in different order, or may be optional. In other embodiments, additional operations may be performed.

Method 500 may start at block 502, where a graphics call to the graphics API may be received (e.g., from the guest OS or an application of the hosted VM). At block 504, a determination may be made on whether a different and dissimilar GPU is being abstracted by the graphics API, and that graphics context information have been accumulated. On determining that a different and dissimilar GPU is being abstracted by the graphics API, and that graphics context information has been accumulated, method 500 may proceed to block 510.

At block 510, a new graphics context may be constructed for the current GPU being abstracted by the graphics API, using the accumulated graphics context information (for the graphics API's prior abstraction of the GPU on the source host computer). As described earlier, the graphics context information may include information about all the resources being used by the graphics operations and their current states. Thereafter, at block 512, the old graphics context (for the graphics API's prior abstraction of the GPU on the source host computer) may be destroyed.

From block 504 (if GPU abstraction of the graphics API has not changed) or from block 512 (on constructing the new graphics context, and destroying the old graphics context), method 500 may proceed to block 506. At block 506, the graphics diver within the hosted VM may be called one or more times to drive the underlying GPU to effectuate the graphics call. At block 508, the response of the graphics driver driving the underlying GPU to effectuate the graphics call may be monitored and tracked, in particular, usage and state of various resources, to maintain the graphics context for the graphics API (in the event of another live migration).

Thereafter, method 500 may return to block 502 to await and serve the next graphics call, if any.

Figure 6:
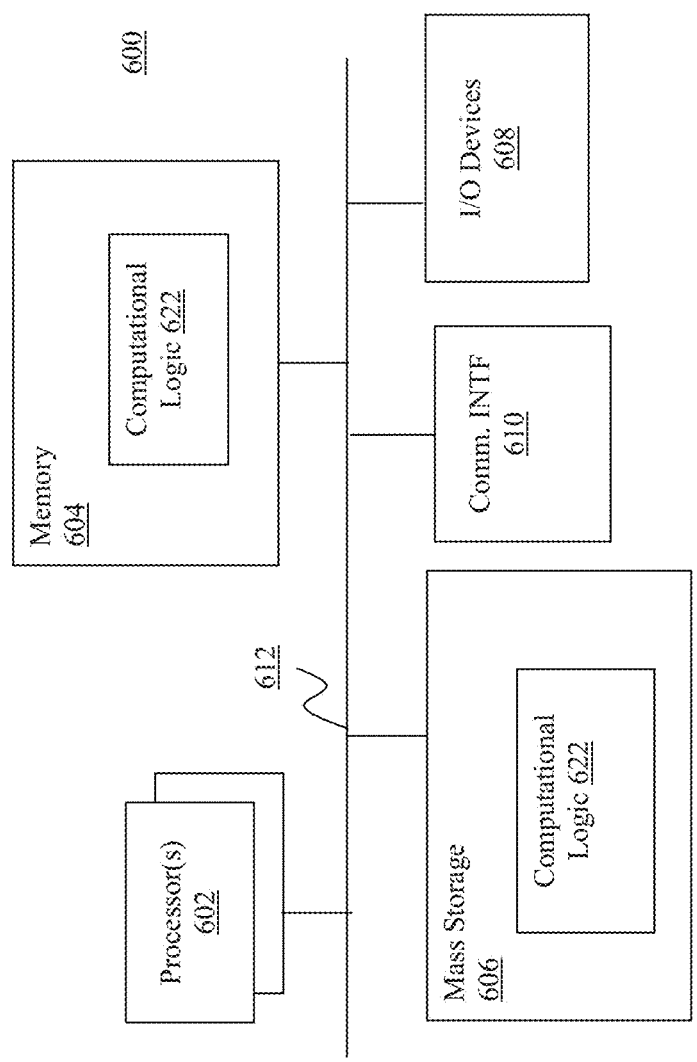
FIG. 6 illustrates an example computer system suitable for use to practice various aspects of the present disclosure, according to the disclosed embodiments.

FIG. 6 illustrates an example computer system that may be suitable for use as a client device or a server to practice selected aspects of the present disclosure. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control and so forth) and communication interfaces 610 (such as network interface cards, modems and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with VMM 114, including memory manager 132 and/or graphics command parser 134, and/or graphics proxy library 152, earlier described, collectively referred to as computational logic 622. The various elements may be implemented by assembler instructions supported by processor(s) 602 or high-level languages, such as, for example, C, that can be compiled into such instructions.

The number, capability and/or capacity of these elements 610-612 may vary, depending on whether computer 600 is used as a client device or a server. When use as client device, the capability and/or capacity of these elements 610-612 may vary, depending on whether the client device is a stationary or mobile device, like a smartphone, computing tablet, ultrabook or laptop. Otherwise, the constitutions of elements 610-612 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 7:
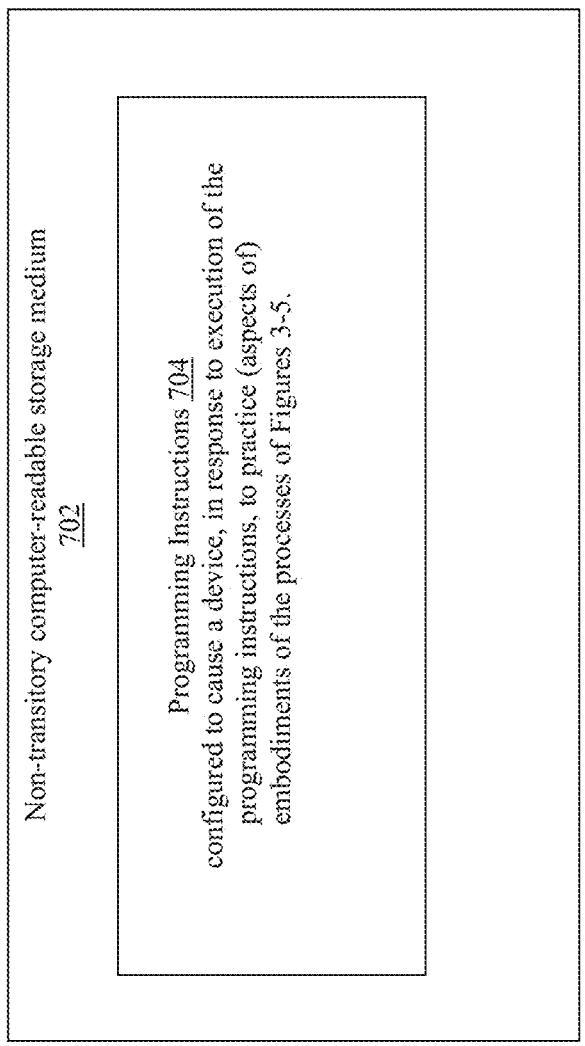
FIG. 7 illustrates a storage medium having instructions for practicing methods described with references to FIGS. 1-5, according to disclosed embodiments.

FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., computer 600, in response to execution of the programming instructions, to perform, e.g., various operations associated with VMM 114, including memory manager 132 and/or graphics command parser 134, and/or graphics proxy library 152. In alternate embodiments, programming instructions 704 may be disposed on multiple computer-readable non-transitory storage media 702 instead. In alternate embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of processors 602 may be packaged together with memory having computational logic 622 (in lieu of storing on memory 604 and storage 606). For one embodiment, at least one of processors 602 may be packaged together with memory having computational logic 622 to form a System in Package (SiP). For one embodiment, at least one of processors 602 may be integrated on the same die with memory having computational logic 622. For one embodiment, at least one of processors 602 may be packaged together with memory having computational logic 622 to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for computing. The apparatus may comprise one or more general purpose processors; a graphics processing unit; system memory coupled with the one or more general purpose processors and the graphics processing unit; and a virtual machine monitor to manage virtual machines hosted by the one or more general purpose processors. The virtual machine monitor may include: a memory manager and a graphics command parser. The memory manager may be configured to manage accesses of the system memory by instructions of applications of the virtual machines, to be executed by the one or more general purpose processors. Management of accesses may include tracking of modified memory pages of the system memory. The graphics command parser may be configured to analyze graphics commands issued to the graphics processing unit by the applications to detect writes to the system memory caused by the graphics commands, and augment the tracking of modified memory pages by the memory manager.

Example 2 may be example 1, wherein the virtual machine monitor further includes a live migration function to selectively live migrate one or more of the virtual machines to another apparatus for computing, including provision of current memory content of a virtual machine being live migrated to the other apparatus, utilizing modified memory pages tracked by the memory manager, as augmented by the graphics command parser.

Example 3 may be example 1 or 2, wherein the graphics command parser may obtain guest graphics memory address of a write to system memory, on detection of the write to system memory.

Example 4 may be example 3, wherein the graphics command parser may further calculate host graphics memory address of the write to system memory, based at least in part on the guest graphics memory address obtained for the write to system memory.

Example 5 may be example 4, wherein the graphics command parser may further obtain system memory address of the write to system memory, based at least in part on the host graphics memory address calculated for the write to system memory.

Example 6 may be example 5, wherein the graphics command parser may further mark one of the memory pages comprising the system memory address as dirty.

Example 7 may be any one of examples 1-6, wherein the graphics command parser may further identify graphics commands supported by the graphics processing unit.

Example 8 may be example 7, wherein the graphics command parser may identify a graphics processor type of the graphics processing unit.

Example 9 may be any one of examples 1-6, wherein the graphics command parser may further analyze the graphics commands to determine whether the graphics commands are supported by the graphics processing unit.

Example 10 may be example 9, wherein the graphics command parser may further determine whether a first of the graphics commands can be modified to a form supported by the graphics processing unit or replace with a functional equivalent graphics command supported by the graphics processing unit, on determination that the first graphics command is not supported by the graphics processing unit.

Example 11 may be example 10, wherein the graphics command parser may further modify the first graphics command to a form supported by the graphics processing unit on determination that the first graphics command can be modified to a form supported by the graphics processing unit, or replace the first graphics command with the other functional equivalent graphics command supported by the graphics processing unit, on determination of existence of the other functional equivalent graphics command.

Example 12 may be any one of examples 1-6 further comprising a graphics proxy library to be instantiated in at least a first of the virtual machines. The graphics proxy library may maintain a context of a graphics application programming interface that abstracts the graphics processing unit for the first virtual machine.

Example 13 may be example 12, wherein the graphics proxy library may further detect whether the context maintained is for a different graphics processing unit abstracted by the graphics application programming interface.

Example 14 may be example 13, wherein the graphics proxy library may construct the context of the graphics application programming interface, on detection that the context maintained is for a different graphics processing unit abstracted by the graphics application programming interface, using a context maintained by the graphics proxy library for the different graphics processing unit abstracted by the graphics application programming interface prior to the first virtual machine having been live migrated from the other apparatus for computing.

Example 15 may be an apparatus for computing, comprising: one or more general purpose processors; a graphics processing unit; system memory coupled with the one or more general purpose processors and the graphics processing unit; and a virtual machine monitor to manage virtual machines hosted by the one or more general purpose processors. The virtual machine monitor may include: a memory manager and a graphics command parser. The memory manager may be configured to manage accesses of the system memory by instructions of applications of the virtual machines, executed by the one or more general purpose processors. The graphics command parser may be configured to analyze graphics commands issued to the graphics processing unit by the applications to determine whether the graphics commands are supported by the graphics processing unit.

Example 16 may be example 15, wherein the graphics command parser may further determine whether a first of the graphics commands can be modified to a form supported by the graphics processing unit or replaced with a functional equivalent graphics command supported by the graphics processing unit, on determination that the first graphics command is not supported by the graphics processing unit.

Example 17 may be example 16, wherein the graphics command parser may further modify the first graphics command to a form supported by the graphics processing unit on determination that the first graphics command can be modified to a form supported by the graphics processing unit, or replace the first graphics command with the other functional equivalent graphics command supported by the graphics processing unit, on determination of existence of the other functional equivalent graphics command.

Example 18 may be any one of examples 15-17 further comprising a graphics proxy library to be instantiated in at least a first of the virtual machines, wherein the graphics proxy library may maintain a context of a graphics application programming interface that abstracts the graphics processing unit for the first virtual machine.

Example 19 may be example 18, wherein the graphics proxy library may further detect whether the context maintained is for a different graphics processing unit abstracted by the graphics application programming interface, wherein the two graphics processing units are different graphics processing units.

Example 20 may be example 19, wherein the graphics proxy library may construct the context of the graphics application programming interface, on detection that the context is maintained for a different graphics processing unit abstracted by the graphics application programming interface, using a context maintained by the graphics proxy library for the different graphics processing unit abstracted by the graphics application programming interface prior to the first virtual machine having been live migrated from the other apparatus for computing.

Example 21 may be an apparatus for computing, comprising: one or more general purpose processors; a graphics processing unit; system memory coupled with the one or more general purpose processors and the graphics processing unit; a virtual machine monitor to manage virtual machines hosted by the one or more general purpose processors; and a graphics proxy library to be instantiated in at least a first of the virtual machines. The graphics proxy library may be configured to maintain a context of a graphics application programming interface that abstracts the graphics processing unit for the first virtual machine.

Example 22 may be example 21, wherein the graphics proxy library may further detect whether the context maintained is for a different graphics processing unit abstracted by the graphics application programming interface.

Example 23 may be example 22, wherein the graphics proxy library may construct the context of the graphics application programming interface, on detection that the context is maintained for a different graphics processing unit being abstracted by the graphics application programming interface, using a context maintained by the graphics proxy library for the different graphics processing unit abstracted by the graphics application programming interface prior to the first virtual machine having been live migrated from the other apparatus for computing.

Example 24 may be a method for computing, comprising: analyzing, by a graphics command parser of a computing system, graphics commands issued to a graphics processing unit of the computing system by applications of virtual machines of the computing system; detecting, by the graphics command parser, writes to system memory of the computing system, caused by the graphics commands; and on detection of writes to system memory, augmenting, by the graphics command parser, modified memory pages tracking by a memory manager of a virtual machine monitor of the computing system.

Example 25 may be example 24, further comprising live migrating one or more of the virtual machines to another computing system, including provision of current memory content of a virtual machine being live migrated to the other computing system, utilizing modified memory pages tracked by the memory manager, as augmented by the graphics command parser.

Example 26 may be example 24 or 25, further comprising obtaining, by the graphics command parser, guest graphics memory address of a write to system memory, on detection of the write to system memory.

Example 27 may be example 26, further comprising calculating, by the graphics command parser, host graphics memory address of the write to system memory, based at least in part on the guest graphics memory address obtained for the write to system memory.

Example 28 may be example 27, further comprising obtaining, by the graphics command parser, system memory address of the write to system memory, based at least in part on the host graphics memory address calculated for the write to system memory.

Example 29 may be example 28, wherein augmenting may comprise marking, by the graphics command parser, one of the memory pages comprising the system memory address as dirty.

Example 30 may be any one of examples 24-29, further comprising identifying, by the graphics command parser, graphics commands supported by the graphics processing unit.

Example 31 may be example 30, further comprising identifying, by the graphics command processor, a graphics processor type of the graphics processing unit.

Example 32 may be any one of examples 24-30, further comprising analyzing, by the graphics command parser, the graphics commands to determine whether the graphics commands are supported by the graphics processing unit.

Example 33 may be example 32, further comprising determining, by the graphics command parser, whether a first of the graphics commands can be modified to a form supported by the graphics processing unit or replace with a functional equivalent graphics command supported by the graphics processing unit, on determination that the first graphics command is not supported by the graphics processing unit.

Example 34 may be example 33, further comprising modifying, by the graphics command parser, the first graphics command to a form supported by the graphics processing unit on determination that the first graphics command can be modified to a form supported by the graphics processing unit, or replacing the first graphics command with the other functional equivalent graphics command supported by the graphics processing unit, on determination of existence of the other functional equivalent graphics command.

Example 35 may be any one of examples 24-30 further comprising maintaining, by a graphics proxy library in a first of the virtual machines, a context of a graphics application programming interface that abstracts the graphics processing unit for the first virtual machine.

Example 36 may be example 35, further comprising detecting, by the graphics proxy library, whether the context maintained is for a different graphics processing unit abstracted by the graphics application programming interface.

Example 37 may be example 36, further comprising constructing, by the graphics proxy library, the context of the graphics application programming interface, on detection that the context maintained is for a different graphics processing unit abstracted by the graphics application programming interface, using a context maintained by the graphics proxy library for the different graphics processing unit abstracted by the graphics application programming interface prior to the first virtual machine having been live migrated to the computing system.

Example 38 may be a method for computing, comprising: analyzing, by a graphics command parser of a computing system, graphics commands issued to a graphics processing unit of the computing system by applications of virtual machines of the computing system, to determine whether the graphics commands are supported by the graphics processing unit; and determining, by the graphics command parser, whether a first of the graphics commands can be modified to a form supported by the graphics processing unit or replaced with a functional equivalent graphics command supported by the graphics processing unit, on determination that the first graphics command is not supported by the graphics processing unit.

Example 39 may be example 38 further comprising modifying, by the graphics command parser the first graphics command to a form supported by the graphics processing unit on determination that the first graphics command can be modified to a form supported by the graphics processing unit, or replacing, by the graphics command parser, the first graphics command with the other functional equivalent graphics command supported by the graphics processing unit, on determination of existence of the other functional equivalent graphics command Example 40 may be any one of examples 38-39 further comprising maintaining, by a graphics proxy library of a first of the virtual machines, a context of a graphics application programming interface that abstracts the graphics processing unit for the first virtual machine.

Example 41 may be example 40 further comprising detecting, by the graphics proxy library, whether the context maintained is for a different graphics processing unit abstracted by the graphics application programming interface, wherein the two graphics processing units are different graphics processing units.

Example 42 may be example 41, further comprising constructing, by the graphics proxy library, the context of the graphics application programming interface, on detection that the context maintained is for a different graphics processing unit being abstracted by the graphics application programming interface, using a context maintained by the graphics proxy library for the different graphics processing unit abstracted by the graphics application programming interface prior to the first virtual machine having been live migrated to the computing system.

Example 43 may be a method for computing, comprising: maintaining, by a graphics proxy library of a first of a plurality of virtual machines of a computing system, for the first virtual machine, a context of a graphics application programming interface that abstracts a graphics processing unit of the computing system; and detecting, by the graphics proxy library, whether the context maintained is for a different graphics processing unit abstracted by the graphics application programming interface.

Example 44 may be example 43, further comprising constructing the context of the graphics application programming interface, on detection that the context is maintained for a different graphics processing unit being abstracted by the graphics application programming interface, using a context maintained by the graphics proxy library for the different graphics processing unit abstracted by the graphics application programming interface prior to the first virtual machine having been live migrated to the computing system.

Example 45 may be at least one computer-readable medium having instructions stored therein to cause a computing system, in response to execution by a processor of the computing system, to implement a graphics command parser to: analyze graphics commands issued to a graphics processing unit of the computing system by applications of virtual machines of the computing system; detect writes to system memory of the computing system, caused by the graphics commands; and on detection of writes to system memory, augment modified memory pages tracking by a memory manager of a virtual machine monitor of the computing system.

Example 46 may be example 45, wherein the computer system may be further caused to implement the virtual machine monitor including the memory manager and a live migration function to selectively live migrate one or more of the virtual machines to another computing system, including provision of current memory content of a virtual machine being live migrated to the other computing system, utilizing modified memory pages tracked by the memory manager, as augmented by the graphics command parser.

Example 47 may be example 45 or 46, wherein the graphics command parser may further obtain guest graphics memory address of a write to system memory, on detection of the write to system memory.

Example 48 may be example 47, wherein the graphics command parser may further calculate host graphics memory address of the write to system memory, based at least in part on the guest graphics memory address obtained for the write to system memory.

Example 49 may be example 48, wherein the graphics command parser may further obtain system memory address of the write to system memory, based at least in part on the host graphics memory address calculated for the write to system memory.

Example 50 may be example 49, wherein the graphics command parser may further mark one of the memory pages comprising the system memory address as dirty.

Example 51 may be any one of examples 45-50, wherein the graphics command parser may further identify graphics commands supported by the graphics processing unit.

Example 52 may be example 51, wherein the graphics command parser may identify a graphics processor type of the graphics processing unit.

Example 53 may be any one of examples 45-50, wherein the graphics command parser may further analyze the graphics commands to determine whether the graphics commands are supported by the graphics processing unit.

Example 54 may be example 53, wherein the graphics command parser may further determine whether a first of the graphics commands can be modified to a form supported by the graphics processing unit or replace with a functional equivalent graphics command supported by the graphics processing unit, on determination that the first graphics command is not supported by the graphics processing unit.

Example 55 may be example 54, wherein the graphics command parser may further modify the first graphics command to a form supported by the graphics processing unit on determination that the first graphics command can be modified to a form supported by the graphics processing unit, or replace the first graphics command with the other functional equivalent graphics command supported by the graphics processing unit, on determination of existence of the other functional equivalent graphics command.

Example 56 may be any one of examples 45-50, wherein the computer system may be further caused to implement a graphics proxy library to be instantiated in at least a first of the virtual machines, wherein the graphics proxy library is to maintain a context of a graphics application programming interface that abstracts the graphics processing unit for the first virtual machine.

Example 57 may be example 56, wherein the graphics proxy library may further detect whether the context maintained is for a different graphics processing unit abstracted by the graphics application programming interface.

Example 58 may be example 57, wherein the graphics proxy library may construct the context of the graphics application programming interface, on detection that the context maintained is for a different graphics processing unit abstracted by the graphics application programming interface, using a context maintained by the graphics proxy library for the different graphics processing unit abstracted by the graphics application programming interface prior to the first virtual machine having been live migrated from the other apparatus for computing.

Example 59 may be at least one computer-readable medium having instructions stored therein to cause a computing system, in response to execution by a processor of the computing system, to implement a graphics command parser to: analyze graphics commands issued to a graphics processing unit of the computing system by applications of virtual machines of the computing system, to determine whether the graphics commands are supported by the graphics processing unit; and determine whether a first of the graphics commands can be modified to a form supported by the graphics processing unit or replaced with a functional equivalent graphics command supported by the graphics processing unit, on determination that the first graphics command is not supported by the graphics processing unit.

Example 60 may be example 59, wherein the graphics command parser may further determine whether a first of the graphics commands can be modified to a form supported by the graphics processing unit or replaced with a functional equivalent graphics command supported by the graphics processing unit, on determination that the first graphics command is not supported by the graphics processing unit.

Example 61 may be example 60, wherein the graphics command parser may further modify the first graphics command to a form supported by the graphics processing unit on determination that the first graphics command can be modified to a form supported by the graphics processing unit, or replace the first graphics command with the other functional equivalent graphics command supported by the graphics processing unit, on determination of existence of the other functional equivalent graphics command.

Example 62 may be any one of examples 59-61, wherein the computer system may be further caused to implement a graphics proxy library to be instantiated in at least a first of the virtual machines, wherein the graphics proxy library is to maintain a context of a graphics application programming interface that abstracts the graphics processing unit for the first virtual machine.

Example 63 may be example 62, wherein the graphics proxy library may further detect whether the context maintained is for a different graphics processing unit abstracted by the graphics application programming interface, wherein the two graphics processing units are different graphics processing units.

Example 64 may be example 63, wherein the graphics proxy library may construct the context of the graphics application programming interface, on detection that the context is maintained for a different graphics processing unit abstracted by the graphics application programming interface, using a context maintained by the graphics proxy library for the different graphics processing unit abstracted by the graphics application programming interface prior to the first virtual machine having been live migrated from the other apparatus for computing.

Example 65 may be at least one computer-readable medium having instructions stored therein to cause a computing system, in response to execution by a processor of the computing system, to implement a graphics proxy library to: maintain for a first of a plurality of virtual machines of the computing system, a context of a graphics application programming interface that abstracts a graphics processing unit of the computing system; and detect whether the context maintained is for a different graphics processing unit abstracted by the graphics application programming interface.

Example 66 may be example 65, wherein the graphics proxy library may construct the context of the graphics application programming interface, on detection that the context is maintained for a different graphics processing unit being abstracted by the graphics application programming interface, using a context maintained by the graphics proxy library for the different graphics processing unit abstracted by the graphics application programming interface prior to the first virtual machine having been live migrated from the other apparatus for computing.

Example 67 may be an apparatus for computing, comprising: one or more general purpose processors; a graphics processing unit; system memory coupled with the one or more general purpose processors and the graphics processing unit; and virtual machine monitor means for managing virtual machines hosted by the one or more general purpose processors. The virtual machine monitor means may include: memory management means for managing accesses of the system memory by instructions of applications of the virtual machines, to be executed by the one or more general purpose processors. Management of accesses may include tracking of modified memory pages of the system memory. The virtual machine monitor means may further include: graphics command parsing means for analyzing graphics commands issued to the graphics processing unit by the applications to detect writes to the system memory caused by the graphics commands, and augment the tracking of modified memory pages by the memory manager.

Example 68 may be example 67, wherein the virtual machine monitor means further may include live migration means for selectively live migrating one or more of the virtual machines to another apparatus for computing, including provision of current memory content of a virtual machine being live migrated to the other apparatus, utilizing modified memory pages tracked by the memory manager, as augmented by the graphics command parser.

Example 69 may be example 67 or 68, wherein the graphics command parsing means may comprise means for obtaining guest graphics memory address of a write to system memory, on detection of the write to system memory.

Example 70 may be example 69, wherein the graphics command parsing means may comprise means for calculating host graphics memory address of the write to system memory, based at least in part on the guest graphics memory address obtained for the write to system memory.

Example 71 may be example 70, wherein the graphics command parsing means may comprise means for obtaining system memory address of the write to system memory, based at least in part on the host graphics memory address calculated for the write to system memory.

Example 72 may be example 71, wherein the graphics command parsing may comprise means for marking one of the memory pages comprising the system memory address as dirty.

Example 73 may be any one of examples 67-72, wherein the graphics command parsing means may comprise means for identifying graphics commands supported by the graphics processing unit.

Example 74 may be example 73, wherein the graphics command parsing means may comprise means for identifying a graphics processor type of the graphics processing unit.

Example 75 may be any one of examples 67-72, wherein the graphics command parsing means may comprise means for analyzing the graphics commands to determine whether the graphics commands are supported by the graphics processing unit.

Example 70 may be example 75, wherein the graphics command parsing means may comprise means for determining whether a first of the graphics commands can be modified to a form supported by the graphics processing unit or replace with a functional equivalent graphics command supported by the graphics processing unit, on determination that the first graphics command is not supported by the graphics processing unit.

Example 77 may be example 76, wherein the graphics command parsing means may comprise means for modifying the first graphics command to a form supported by the graphics processing unit on determination that the first graphics command can be modified to a form supported by the graphics processing unit, or replace the first graphics command with the other functional equivalent graphics command supported by the graphics processing unit, on determination of existence of the other functional equivalent graphics command.

Example 78 may be any one of examples 67-72 further comprising graphics proxy library means to be instantiated in at least a first of the virtual machines, for maintaining a context of a graphics application programming interface that abstracts the graphics processing unit for the first virtual machine.

Example 79 may be example 78, wherein the graphics proxy library means may comprise means for detecting whether the context maintained is for a different graphics processing unit abstracted by the graphics application programming interface.

Example 80 may be example 79, wherein the graphics proxy library means may comprise means for constructing the context of the graphics application programming interface, on detection that the context maintained is for a different graphics processing unit abstracted by the graphics application programming interface, using a context maintained by the graphics proxy library for the different graphics processing unit abstracted by the graphics application programming interface prior to the first virtual machine having been live migrated from the other apparatus for computing.

Example 81 may be an apparatus for computing, comprising: one or more general purpose processors; a graphics processing unit; system memory coupled with the one or more general purpose processors and the graphics processing unit; and virtual machine monitor means for managing virtual machines hosted by the one or more general purpose processors. The virtual machine monitor may include: memory management means for managing accesses of the system memory by instructions of applications of the virtual machines, executed by the one or more general purpose processors; and graphics command parsing means for analyzing graphics commands issued to the graphics processing unit by the applications to determine whether the graphics commands are supported by the graphics processing unit.

Example 82 may be example 81, wherein the graphics command parsing means may comprise means for determining whether a first of the graphics commands can be modified to a form supported by the graphics processing unit or replaced with a functional equivalent graphics command supported by the graphics processing unit, on determination that the first graphics command is not supported by the graphics processing unit.

Example 83 may be example 82, wherein the graphics command parsing means may comprise means for modifying the first graphics command to a form supported by the graphics processing unit on determination that the first graphics command can be modified to a form supported by the graphics processing unit, or replace the first graphics command with the other functional equivalent graphics command supported by the graphics processing unit, on determination of existence of the other functional equivalent graphics command.

Example 84 may be any one of examples 81-83 further comprising graphics proxy library means to be instantiated in at least a first of the virtual machines, for maintaining a context of a graphics application programming interface that abstracts the graphics processing unit for the first virtual machine.

Example 85 may be example 84, wherein the graphics proxy library means may comprise means for detecting whether the context maintained is for a different graphics processing unit abstracted by the graphics application programming interface, wherein the two graphics processing units are different graphics processing units.

Example 86 may be example 85, wherein the graphics proxy library means may comprise means for constructing the context of the graphics application programming interface, on detection that the context is maintained for a different graphics processing unit abstracted by the graphics application programming interface, using a context maintained by the graphics proxy library for the different graphics processing unit abstracted by the graphics application programming interface prior to the first virtual machine having been live migrated from the other apparatus for computing.

Example 87 may be an apparatus for computing, comprising: one or more general purpose processors; a graphics processing unit; system memory coupled with the one or more general purpose processors and the graphics processing unit; virtual machine monitor means for managing virtual machines hosted by the one or more general purpose processors; and graphics proxy library means to be instantiated in at least a first of the virtual machines, for maintaining a context of a graphics application programming interface that abstracts the graphics processing unit for the first virtual machine.

Example 88 may be example 87, wherein the graphics proxy library means may comprise means for detecting whether the context maintained is for a different graphics processing unit abstracted by the graphics application programming interface.

Example 89 may be example 88, wherein the graphics proxy library means may comprise means for constructing the context of the graphics application programming interface, on detection that the context is maintained for a different graphics processing unit being abstracted by the graphics application programming interface, using a context maintained by the graphics proxy library for the different graphics processing unit abstracted by the graphics application programming interface prior to the first virtual machine having been live migrated from the other apparatus for computing.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
one or more general purpose processors;
a graphics processing unit;
system memory coupled with the one or more general purpose processors and the graphics processing unit; and
a virtual machine monitor to manage virtual machines hosted by the one or more general purpose processors, wherein the virtual machine monitor includes:
  a memory manager to manage accesses of the system memory by instructions of applications of the virtual machines, to be executed by the one or more general purpose processors, wherein management of accesses includes tracking of modified memory pages of the system memory;
  a graphics command parser to analyze graphics commands issued to the graphics processing unit by the applications to detect writes to the system memory caused by the graphics commands, and augment the memory manager's tracking of modified memory pages, such that the memory manager's tracking of modified memory pages and tracking augmentations made by the graphics command parser can be used to live migrate one or more of the virtual machines to another apparatus for computing; and
  a live migration function to live migrate one or more of the virtual machines to another apparatus for computing, including provision of current memory content of a virtual machine being live migrated to the other apparatus, utilizing the modified memory pages tracked by the memory manager and the tracking augmentations made by the graphics command parser.

2. The apparatus of claim 1, wherein the graphics command parser is to obtain a guest graphics memory address of a graphics command that performs a write to the system memory, on detection of the graphics command that performs a write to the system memory.

3. The apparatus of claim 2, wherein the graphics command parser is to further calculate a corresponding host graphics memory address of the guest graphics memory address of the graphics command that performs a write to the system memory, based at least in part on the guest graphics memory address obtained for the graphics command that performs a write to the system memory.

4. The apparatus of claim 3, wherein the graphics command parser is to further obtain a corresponding system memory address of the host graphics memory address of the graphics command that performs a write to the system memory, based at least in part on the host graphics memory address calculated for the graphics command that performs a write to the system memory.

5. The apparatus of claim 4, wherein the graphics command parser is to further mark one of the memory pages comprising the system memory address of the graphics command that performs a write to the system memory, as dirty.

6. The apparatus of claim 1, wherein the graphics command parser is to further determine whether a first of the graphics commands can be modified to a form supported by the graphics processing unit or replaced with a functional equivalent graphics command supported by the graphics processing unit, on determination that the first graphics command is not supported by the graphics processing unit.

7. The apparatus of claim 6, wherein the graphics command parser is to further modify the first graphics command to a form supported by the graphics processing unit on determination that the first graphics command can be modified to a form supported by the graphics processing unit, or replace the first graphics command with another functional equivalent graphics command supported by the graphics processing unit, on determination of existence of the other functional equivalent graphics command.

8. The apparatus of claim 1 further comprising a graphics proxy library to be instantiated in at least a first of the virtual machines, wherein the graphics proxy library is to maintain a context of a graphics application programming interface that abstracts the graphics processing unit for the first virtual machine.

9. The apparatus of claim 8, wherein the graphics proxy library is to further detect whether the context maintained is for a different graphics processing unit abstracted by the graphics application programming interface.

10. The apparatus of claim 9, wherein the graphics proxy library is to construct the context of the graphics application programming interface, on detection that the context is maintained for a different graphics processing unit being abstracted by the graphics application programming interface, using a context maintained by the graphics proxy library for the different graphics processing unit abstracted by the graphics application programming interface prior to the first virtual machine having been live migrated from the other apparatus for computing.

11. An apparatus for computing, comprising:
one or more general purpose processors;
a graphics processing unit;
system memory coupled with the one or more general purpose processors and the graphics processing unit; and
a virtual machine monitor to manage virtual machines hosted by the one or more general purpose processors, wherein the virtual machine monitor includes:
  a memory manager to manage accesses of the system memory by instructions of applications of the virtual machines, executed by the one or more general purpose processors, wherein management of accesses includes tracking of modified memory pages of the system memory; and
  a graphics command parser to analyze graphics commands issued to the graphics processing unit by the applications to determine whether the graphics commands are supported by the graphics processing unit, to detect writes to the system memory caused by the graphics commands, and augment the memory manager's tracking of modified memory pages, such that the memory manager's tracking of modified memory pages and tracking augmentations made by the graphics command parser can be used to live migrate one or more of the virtual machines to another apparatus for computing; and a live migration function to live migrate one or more of the virtual machines to another apparatus for computing, including provision of current memory content of a virtual machine being live migrated to the other apparatus, utilizing the modified memory pages tracked by the memory manager and the tracking augmentations made by the graphics command parser.

12. The apparatus of claim 11, wherein the graphics command parser is to further determine whether a first of the graphics commands can be modified to a form supported by the graphics processing unit or replaced with a functional equivalent graphics command supported by the graphics processing unit, on determination that the first graphics command is not supported by the graphics processing unit.

13. The apparatus of claim 12, wherein the graphics command parser is to further modify the first graphics command to a form supported by the graphics processing unit on determination that the first graphics command can be modified to a form supported by the graphics processing unit, or replace the first graphics command with another functional equivalent graphics command supported by the graphics processing unit, on determination of existence of the other functional equivalent graphics command.

14. The apparatus of claim 11 further comprising a graphics proxy library to be instantiated in at least a first of the virtual machines, wherein the graphics proxy library is to maintain a context of a graphics application programming interface that abstracts the graphics processing unit for the first virtual machine.

15. A method for computing, comprising:
analyzing, by a graphics command parser of a computing system, graphics commands issued to a graphics processing unit of the computing system by applications of virtual machines of the computing system;
detecting, by the graphics command parser, writes to system memory of the computing system, caused by the graphics commands;
on detection of writes to system memory, augmenting, by the graphics command parser, tracking of modified memory pages by a memory manager of a virtual machine monitor of the computing system, such that the memory manager's tracking of modified memory pages and tracking augmentations made by the graphics command parser can be used to live migrate one or more of the virtual machines to another computing system; and
live migrating one or more of the virtual machines to another computing system, including provision of current memory content of a virtual machine being live migrated to the other computing system, utilizing modified memory pages tracked by the memory manager and the tracking augmentations made by the graphics command parser.

16. The method of claim 15, further comprising determining, by the graphics command parser, whether a first of the graphics commands can be modified to a form supported by the graphics processing unit or replaced with a functional equivalent graphics command supported by the graphics processing unit, on determination that the first graphics command is not supported by the graphics processing unit.

17. The method of claim 16, further comprising modifying, by the graphics command parser, the first graphics command to a form supported by the graphics processing unit on determination that the first graphics command can be modified to a form supported by the graphics processing unit, or replacing the first graphics command with another functional equivalent graphics command supported by the graphics processing unit, on determination of existence of the other functional equivalent graphics command.

18. The method of claim 15 further comprising maintaining, by a graphics proxy library in a first of the virtual machines, a context of a graphics application programming interface that abstracts the graphics processing unit for the first virtual machine.

19. The method of claim 18, further comprising detecting, by the graphics proxy library, whether the context maintained is for a different graphics processing unit abstracted by the graphics application programming interface.

20. The method of claim 19, further comprising constructing, by the graphics proxy library, the context of the graphics application programming interface, on detection that the context maintained is for a different graphics processing unit abstracted by the graphics application programming interface, using a context maintained by the graphics proxy library for the different graphics processing unit abstracted by the graphics application programming interface prior to the first virtual machine having been live migrated to the computing system.

21. At least one non-transitory computer-readable medium having instructions stored therein to cause a computer system, in response to execution by a processor of the computer system, to implement a graphics command parser within a virtual machine monitor of the computer system to:
analyze graphics commands issued to a graphics processing unit of the computer system by applications of virtual machines of the computer system;
detect writes to system memory of the computer system, caused by the graphics commands;
on detection of writes to system memory, augment tracking of modified memory pages being performed by a memory manager of the virtual machine monitor of the computer system, such that the memory manager's tracking of modified memory pages and tracking augmentations made by the graphics command parser can be used to live migrate one or more of the virtual machines to another computer system; and
live migrate one or more of the virtual machines to another computer system, including provision of current memory content of a virtual machine being live migrated to the other computer system, utilizing modified memory pages tracked by the memory manager and the tracking augmentations made by the graphics command parser.

22. The non-transitory computer-readable medium of claim 21, wherein the computer system is further caused to implement a graphics proxy library to be instantiated in at least a first of the virtual machines, wherein the graphics proxy library is to maintain a context of a graphics application programming interface that abstracts the graphics processing unit for the first virtual machine.

* * * * *